(12) United States Patent
Hakes et al.

(10) Patent No.: US 6,310,311 B1
(45) Date of Patent: Oct. 30, 2001

(54) INTEGRATED BUSHING COMPONENT

(76) Inventors: Gary Hakes, 6839 Rich Valley Rd., Bristol, VA (US) 24202; Glenn E. Himstedt, 187 Heritage Dr., Bristol, VA (US) 24201

(*) Notice: Subject to any disclaimer, the term of this patent is extended or adjusted under 35 U.S.C. 154(b) by 0 days.

(21) Appl. No.: 09/368,977

(22) Filed: Aug. 5, 1999

(51) Int. Cl.$^7$ .................................................. H01H 33/02
(52) U.S. Cl. ............................. 218/154; 218/65; 218/155
(58) Field of Search ................................ 200/48 R, 48 A, 200/48 V, 485 B, 48 CB, 48 P, 48 KB, 240–261, 49; 218/1, 3, 6, 45, 57–67, 80, 100, 11, 12, 7, 153, 154; 439/185

(56) References Cited

U.S. PATENT DOCUMENTS

| | | | |
|---|---|---|---|
| 2,872,550 | * | 2/1959 | Schwager ................... 218/3 |
| 3,891,893 | * | 6/1975 | Thaler ................... 218/57 X |
| 4,514,606 | * | 4/1985 | Veverka ................... 218/12 |
| 5,091,616 | * | 2/1992 | Ramos et al. ............. 218/9 |
| 5,510,590 | * | 4/1996 | Hux ....................... 218/6 |
| 5,561,280 | * | 10/1996 | Blatter .................. 218/59 |
| 5,600,112 | * | 2/1997 | Opfer .................... 218/154 |
| 5,898,150 | * | 4/1999 | Gallix et al. .......... 218/66 |

* cited by examiner

Primary Examiner—J. R. Scott
(74) Attorney, Agent, or Firm—Robert J. Veal

(57) ABSTRACT

An integrated bushing component for use in conjunction with pad mounted high voltage three-phase switch gear located with an electrical cabinet. The integrated bushing component providing an electrically insulated conductive path through a dead front barrier separating a first switch gear confinement area, wherein a first electrical circuit is connected to the switch gear mounted therein, and an second electrical connection confinement area, wherein connection to a second electrical circuit is provided by an end of the integrated bushing component. The switch gear includes a switch arm selectively positionable between an open non-conducting position and a closed conducting position. The switch arm provides a primary conductive path connecting a first electrical circuit with a terminal when the switch arm is placed in the closed conducting position. The integrated bushing includes, in a unitary component, a conductive inner core and a pump housing which receives an electrical arc extinguishing pump therein. The arc extinguishing pump defines a movable contact to provide a secondary conductive path between the terminal and a probe connector conductively attached to the switch arm so as to contain and extinguish an arc created upon movement of the switch arm form the closed position to the open position.

18 Claims, 7 Drawing Sheets

INTEGRATED BUSHING COMPONENT

FIELD OF THE INVENTION

The present invention relates to the field of high voltage electrical switch gear components. More particularly, the present invention relates to the field of pad mounted three-phase switch gear components. With even greater particularity, the present invention relates to pad mounted three-phase high voltage switch gear components employing what is generally known as a dead front type configuration with an electrical through bushing transferring current through the dead front wherein an electrical arc extinguishing pump assembly is utilized to snuff out the electrical arc formed when the electrical current is disengaged by a switch gear assembly positioned behind the dead front. With even further particularity, the present invention relates to a high voltage switch gear component integrating an electrical through bushing and an electrical arc extinguishing pump assembly into a single component.

BACKGROUND OF THE INVENTION

The current industry practice and design with regard to dead front type switch gear is to utilize separately mounted components for extinguishing the electrical arc created when a high voltage switch is opened, and for transferring the electrical current through a dead front barrier from the hot, or live side of the barrier to the dead front, or safe side of the barrier, to what is generally termed an elbow connector. An elbow connector is used on the safe side of the dead front to electrically connect the enclosed switch gear to the desired electrical component, such as a transformer, large electrical machine, or other electrical apparatus. This utilization of separate individual components for the through bushing (A) and the electrical arc extinguishing pump assembly (B), as shown in prior art FIG. 1, necessitates the use of an electrical bus (C) and two sets of connecting hardware to electrically interconnect the separately mounted components, as well as two sets of mounting hardware (D) to secure the individual components. Additionally, as standard industry procedure is to mount the through bushing immediately above the electrical arc extinguishing pump assembly, the current practice of utilizing separate components requires substantial vertical area to accommodate the separately mounted components behind the dead front barrier. Inasmuch as these particular types of electrical components are nearly always mounted within an a grounded conductive cabinet with the high voltage conductive current carrying parts insulated from the cabinet, the requirement of substantial vertical area to accommodate the separately mounted electrical components inherently necessitates that the grounded conductive cabinets be manufactured to an increased size or dimension in order to accommodate the substantial vertical area necessary to house the individually mounted components. This increased size or dimension directly increases the manufacturing costs of the cabinets.

SUMMARY OF THE INVENTION

It is an object of the present invention to provide a through the wall type electrical transfer bushing having an integrally formed housing for receiving an electrical arc extinguishing pump assembly for use in pad mounted electrical switch gear installations. It is a further object of the present invention to provide an integrated electrical through bushing and electrical arc extinguishing pump housing which allows for the elimination of the electrical bus interconnection between the individual bushing and housing components for use in pad mounted electrical switch gear. It is a further object of the present invention to provide an integrated electrical through bushing and electrical arc extinguishing pump housing utilizing substantially less component area for use in pad mounted switch gear. It is further object of the present invention to provide an integrated electrical through bushing and electrical arc extinguishing pump housing, which can be integrally mounted to a dead front barrier or built into a switch assembly for use with a dead front barrier. Further, it is an object of the present invention to provide an integrated electrical through bushing and electrical arc extinguishing pump housing utilizing substantially less material, mounting hardware, and vertical space, therefore reducing the manufacturing, material, and installation costs.

BRIEF DESCRIPTION OF THE DRAWINGS

An article of manufacture embodying the features of the present invention is depicted in the accompanying drawings, which form a portion of this disclosure, wherein.

DETAILED DESCRIPTION OF THE PREFERRED EMBODIMENT

Figure 1:
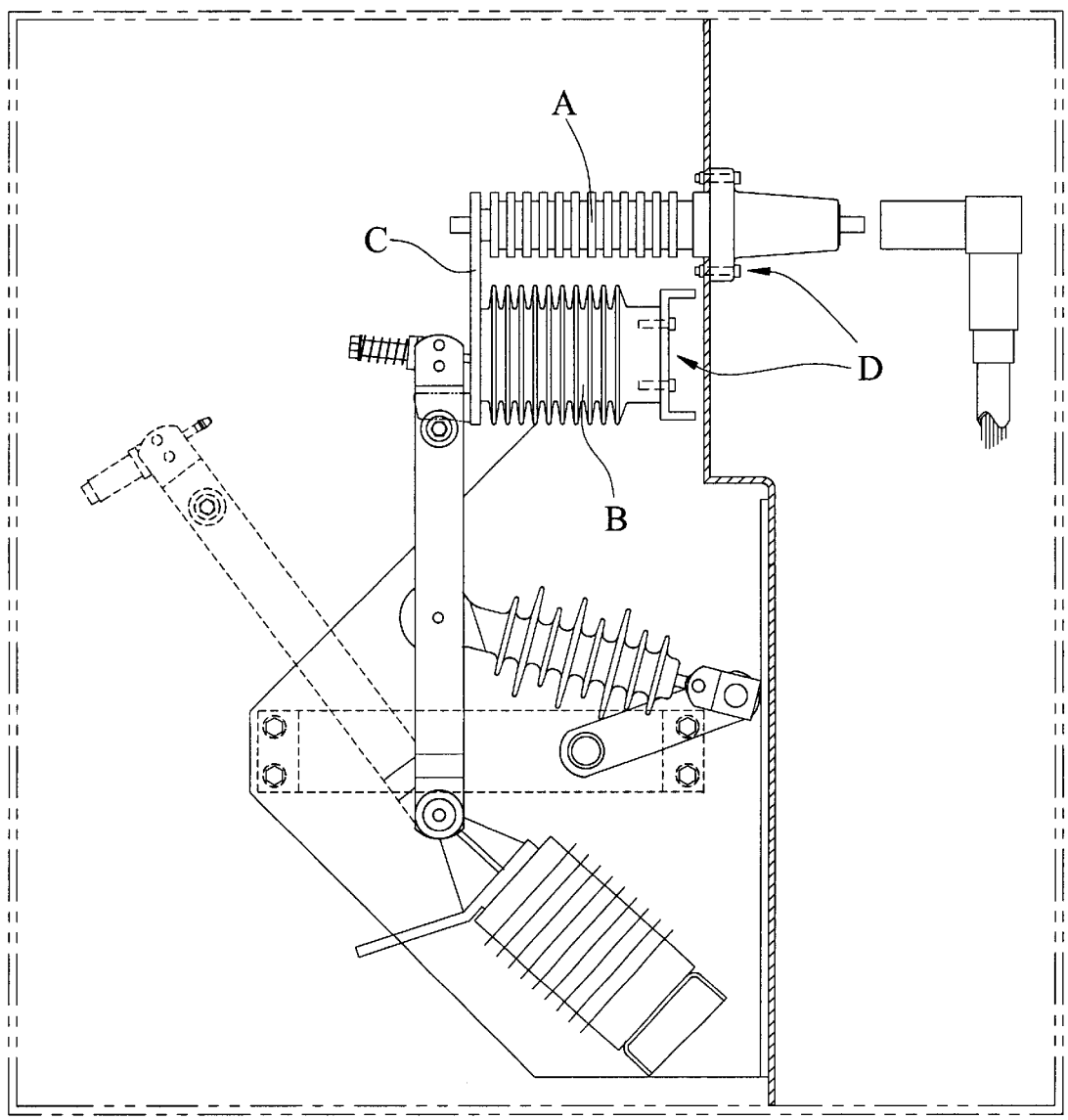
FIG. 1 is a side elevational view of a prior art dead front type switch gear apparatus and through bushing.
Figure 2:
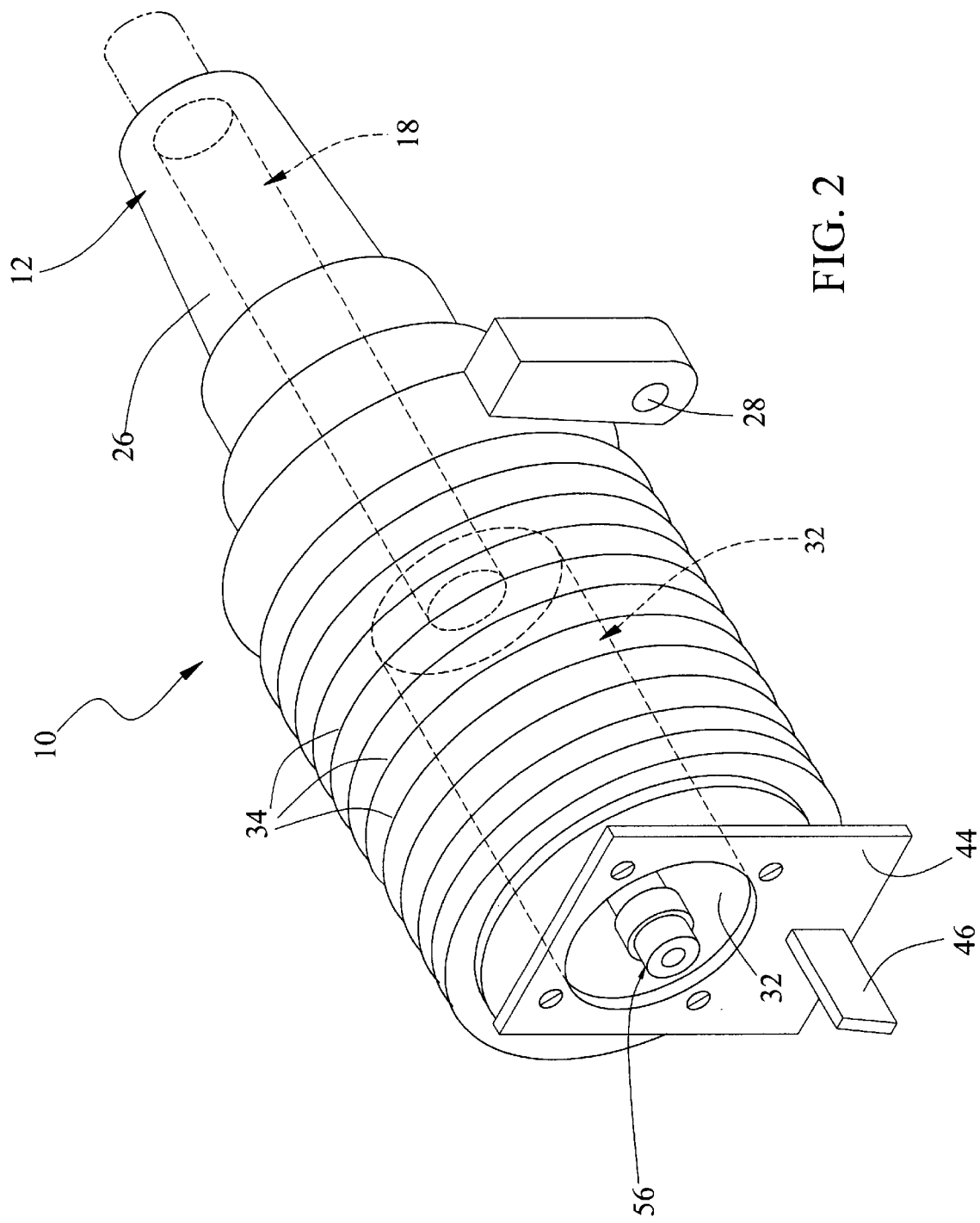
FIG. 2 is a perspective view of a single-axis through bushing.
Figure 3:
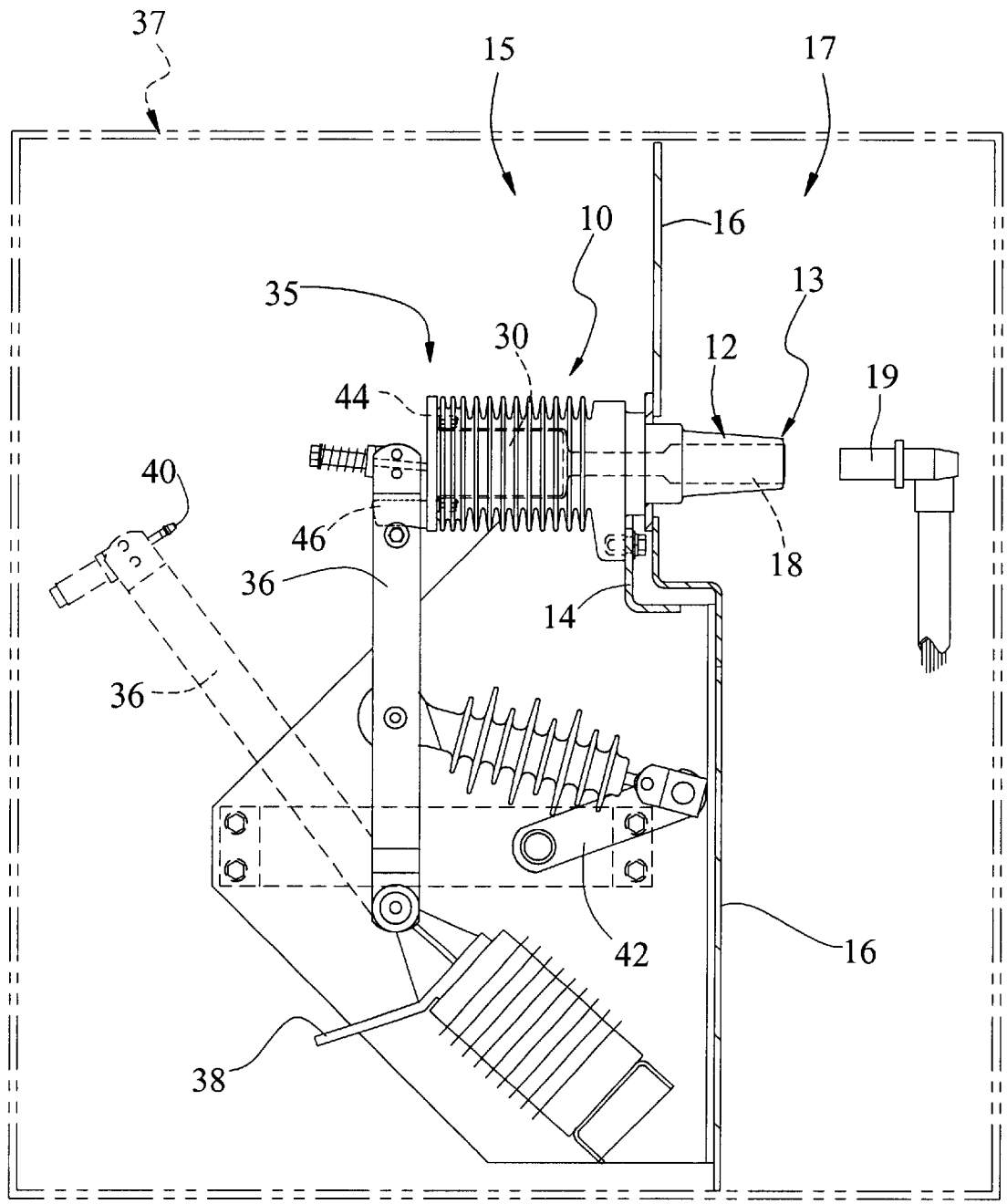
FIG. 3 is a side elevational view of a single-axis through bushing mounted in a typical switch gear enclosure.
Figure 7:
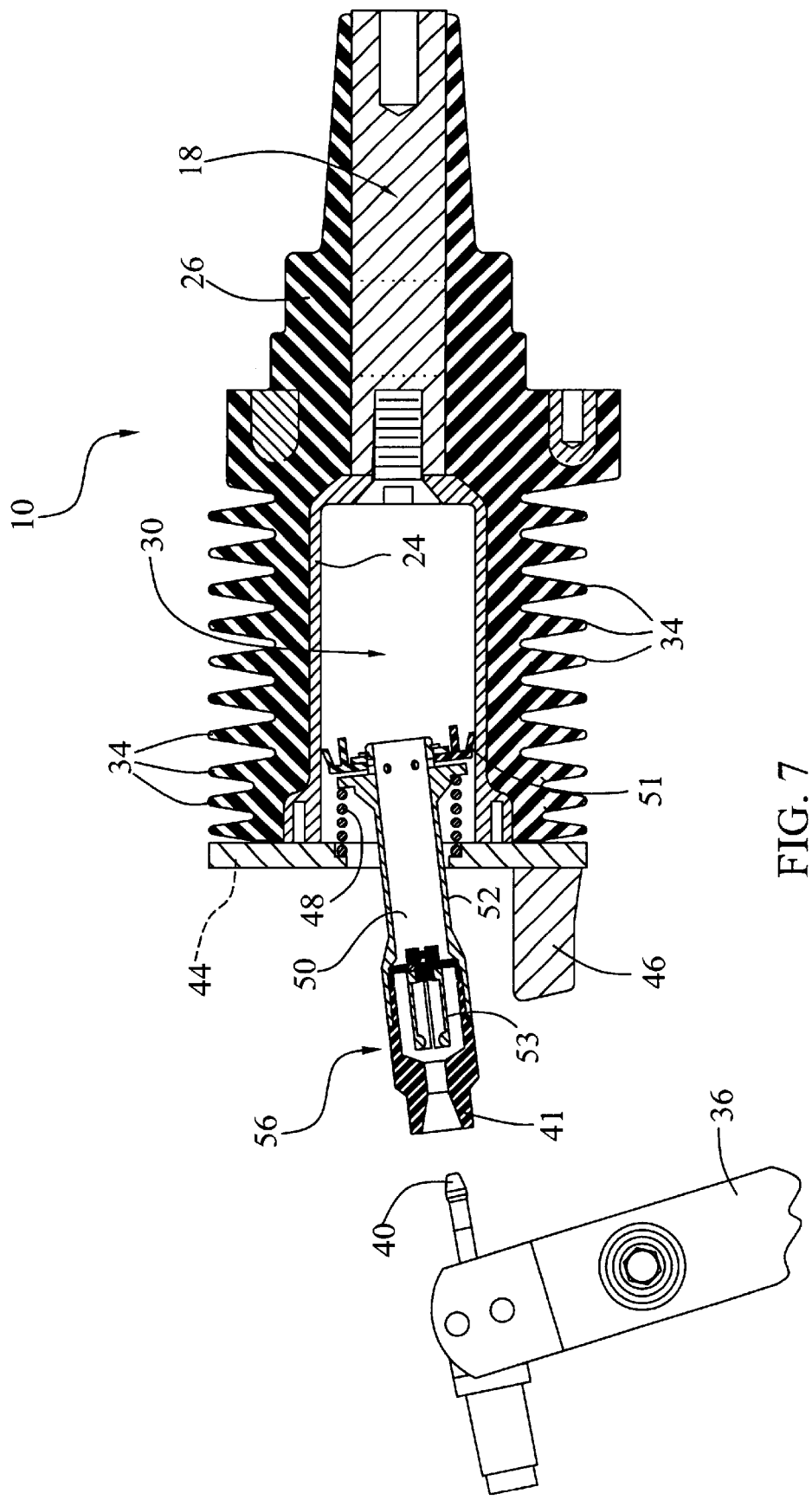
FIG. 7 is a sectional view of a single-axis through bushing shown with an electrical arc extinguishing pump assembly and a switch gear arm.

Referring to the drawings for a better understanding of the principles of operation and structure of the invention, it will be seen that FIG. 2 shows a perspective view of the first embodiment of the article of manufacture, a single axis integrated bushing component, which is generally shown at 10. Integrated bushing component 10 serves two primary functions: first, integrated bushing component 10 provides a means for transferring electrical current from a hot or live side 15 of a dead front barrier 16 corresponding to a first inner switch gear confinement area inside electrical cabinet 37, to a dead or safe side 17 of dead front barrier 16 corresponding to a second outer electrical component confinement area of electrical cabinet 37, as shown in FIG. 3; and second, integrated bushing component 10 provides a housing 30 for receiving an electrical arc extinguishing pump assembly 56, as shown in FIG. 7.

Figure 4:
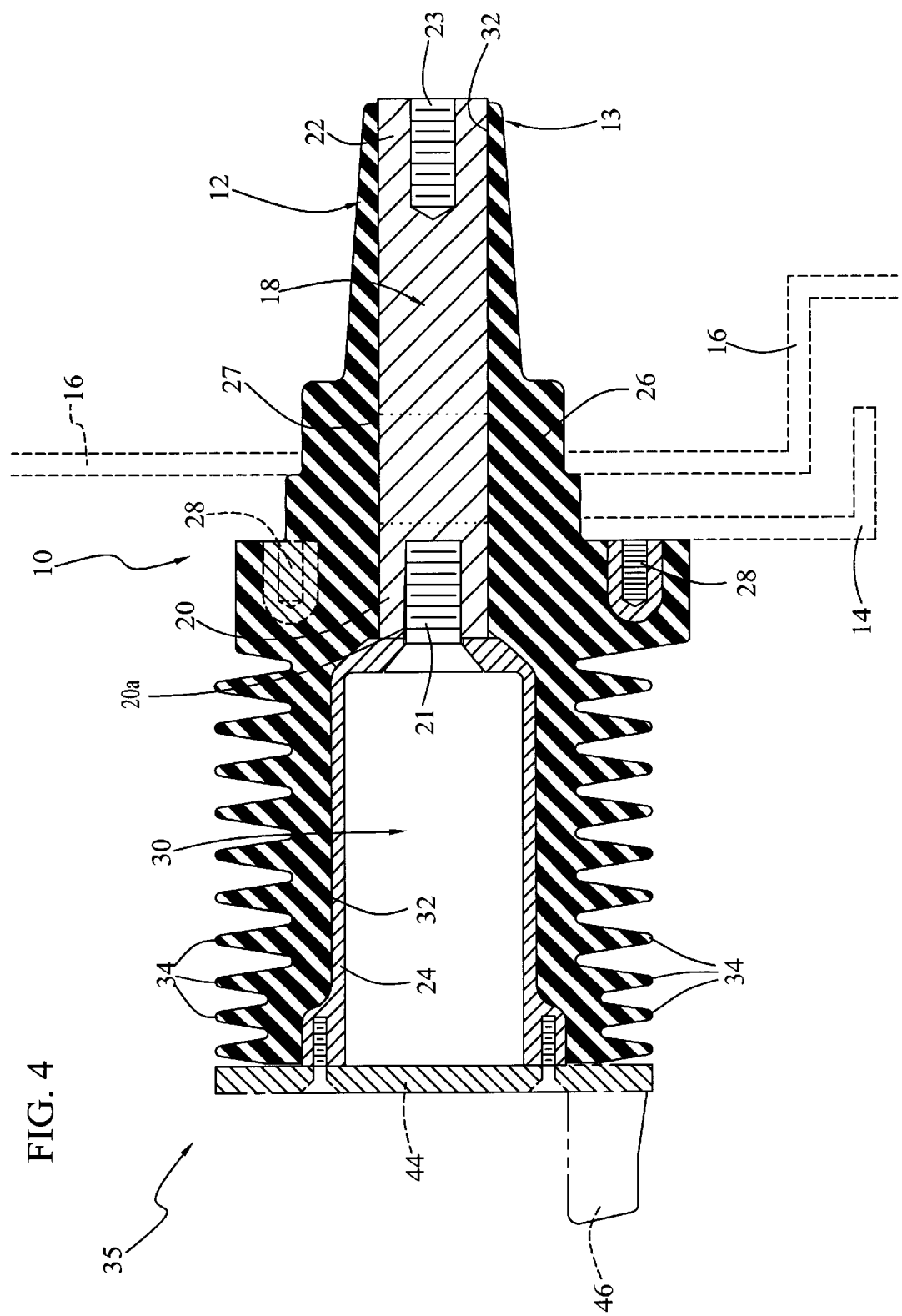
FIG. 4 is a sectional view of a single-axis through bushing.
Figure 6:
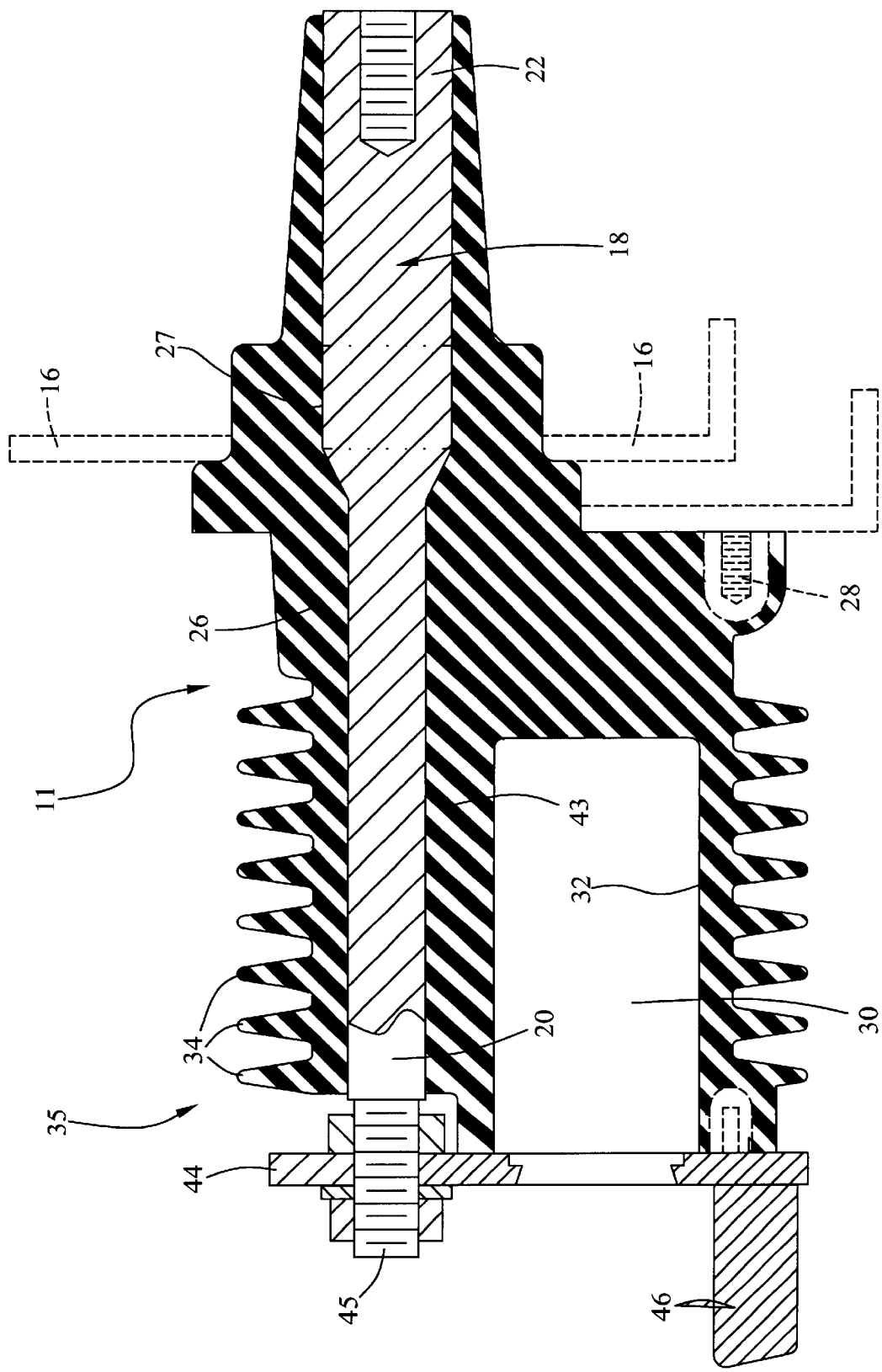
FIG. 6 is a sectional view of a dual-axis through bushing.

The first primary function of bushing component 10, that of providing a means for transferring electrical current from the hot side 15 of dead front barrier 16 to the safe side 17 of dead front barrier 16 is accomplished by providing an electrically insulated bore extending axially through said integrated bushing component 10, the bore receiving an axially extending electrically conductive inner core 18, which is clearly shown in FIGS. 4 and 6. Inner core 18 includes a first end 20 and a second end 22, for receiving electrical connection. In the present embodiment, the first end 20 has a threaded bore 20a formed therein for receiving and securing a first conductive threaded rod 21 to conductive inner core 18, such that inner core 18 is in electrical connection with conductive sleeve 24. Second end 22 of inner core 18 also has a threaded bore 23 for receiving a second conductive threaded rod and completing electrical connection thereto. Sleeve 24 and core 18 may also be formed as a unitary member. Generally, electrical connection on the safe side 17 of dead front barrier 16 is accomplished through commercially available electrical connection components, generally termed elbows 19, as shown in FIG. 3. Inner core 18, although not limited to any particular conductive material, is nonetheless generally manufactured from copper or aluminum and has an electrically insulating outer layer 26 enclosing it therein. Outer layer 26 electrically insulates inner core 18 from electrical conductivity with other components, and specifically insulates inner core 18 from electrical contact or connection with dead front barrier 16, switch gear frame 14. This feature is critical to the function of component 10, as any contact by conductive inner core 18 with dead front barrier 16 thereafter renders dead front barrier 16 electrically live and dangerous to the touch. Therefore, it is critical that insulative outer layer 26 maintain discontinuity of electrical contact between dead front barrier 16 and conductive inner core 18. Outer layer 26 is secured to conductive inner core 18 via knurled area 27, as knurled area 27 provides a surface for outer layer 26 to adhere to during the molding process of component 10, or insertion of inner core 18 after molding. Although the preferred embodiment is generally manufactured from a molding process, other methods of manufacture are contemplated within the present invention. Integrated bushing component 10 as a whole is typically secured to switch gear frame 14 by common bolts, which can be rotatably secured within threaded mounting bores 28 formed in outer layer 26. Electrically insulating outer layer 26, although specifically not limited to any particular insulative material, is generally molded from a cyloaliphatic epoxy resin material, or equivalent.

The second primary function of integrated bushing 10 is to provide an integrally formed housing 30 for receiving electrical arc extinguishing pump assembly 56. Integrally formed housing 30 includes a pump bore 32 having conductive sleeve 24 or lining within bore 32 for receiving electrical arc extinguishing pump assembly 56. Sleeve 24, which is generally manufactured from a conductive material such as copper or aluminum, electrically connects first threaded rod 21 to terminal 44, and is secured within bore 32 by first threaded rod 21. Housing 30 is electrically insulating, as it is integrally molded within electrically insulated outer layer 26 of through bushing 12, again generally, from a cyloaliphatic epoxy resin material. The exterior surface of integrally formed housing 30 includes a number of fins 34, also molded from the electrically insulating cyloaliphatic epoxy resin material. The insulating properties of the cyloaliphatic epoxy resin material in conjunction with the increased surface distance provided by fins 34 from dead front barrier 16, which is ideally at zero potential voltage, to the live side 35 of bushing component 10, serves to increase the seepage rating of component 10, along with increasing the strike distance.

In the single axis embodiment of the integrated bushing component10 illustrated in FIGS. 2–4 and 7, through bushing 12 and insulated housing 30 share a common axis, as the conductive inner core 18, insulated housing 30, and pump bore 32 share common centerlines. Housing 30 is integrally molded with insulating outer layer 26 of through bushing 12, such that bore 32 in housing 30 abuts first end 20 of conductive inner core 18. This abutment of bore 32 with first end 20 of conductive inner core 18 allows for sleeve 24 to be in electrical connection with conductive inner core 18 through the insertion of first threaded rod 21, thereby completing electrical connection from the live side 35 of component 10 to second end 22 of conductive inner core 18 and defining a receiver 13 for connection of elbow 19.

Live side 35 of housing 30 includes an electrically conductive terminal 44 for engaging switch gear arm 36, which is generally secured to housing 30 via bolts. Electrical current reaches live side 35 of integral bushing component 10 through switch gear arm 36, which is also manufactured from a conductive material. Switch gear arm 36 is generally connected to a primary power source via power source connection 38 inside electrical cabinet 37, and behind dead front barrier 16. Electrical current travels from power source connector 38 through switch gear arm 36 and into terminal 44 via stab 46. Stab 46 electrically engages switch gear arm 36 when switch gear arm 36 is pivotally positioned proximate electrically conductive terminal 44 by switch gear arm actuator 42. Upon contact of switch gear arm 36 and stab 46, electrical current is able to flow through component 10 via conductive inner core 18 to the safe side 17 of dead front barrier 16 into elbow 19. Although the preferred embodiment illustrates the current path traveling from a power source through switch gear arm 36 and then through integrated bushing component 10, a reverse current path is contemplated within the present invention.

Switch gear arm 36 can be pivoted away from integrated bushing component 10 via manual actuation of switch gear arm actuator 42, thereby discontinuing electrical contact. Initial actuation of switch gear arm actuator 42 disengages stab 46 from switch gear arm 36, thereby discontinuing the primary electrical current path. However, electrical current can still flow into terminal 44, and therefore integrated bushing component 10, through probe connector 40. Probe connector 40 is in electrical connection with terminal 44 via a contactor 53, conductive pump piston 52, and conductive biasing spring 48 of electrical arc extinguishing pump assembly 56, as shown in FIG. 7. Further actuation of switch gear arm actuator 42 causes the distance between switch gear arm 36 and terminal 44 to increase, thereby urging electrical arc extinguishing pump assembly positioned within sleeve 24 to travel towards switch gear arm 36. This motion is resisted by pump biasing spring 48, which urges electrical arc extinguishing pump assembly 56 to move away from switch gear arm 36. As electrical arc extinguishing pump assembly 56 travels concomitantly with switch gear arm 36, the biasing force exerted upon electrical arc extinguishing pump assembly 56 by biasing spring 48 increases to a point at which probe connector 40 disengages electrical arc extinguishing pump assembly 56. At the instant of disengagement of probe connector 40, the biasing force of biasing spring 48 causes electrical arc extinguishing pump assembly 56 to rapidly travel away from switch gear arm 36 into sleeve 24. Simultaneously, an electrical arc forms between probe connector 40 and electrical arc extinguishing pump assembly 56, as a result of the electrical disconnection. This electrical arc is extinguished by a puff of air created by engagement of diaphragm 51 of electrical arc extinguishing pump assembly 56 with sleeve 24, thereby reducing the volume of air within sleeve 24. This reduction in volume causes the air within sleeve 24 to travel through an air passageway 50 of electrical arc extinguishing pump assembly 56 to the point where the electrical arc is formed, namely, contactor 51, thereby directing the puff of air to the point of the electrical arc. This puff of air created by electrical arc extinguishing pump assembly 56 extinguishes the electrical arc formed upon disengagement of probe connector 40 from contactor 52 and exits via a nonconductive nozzle 41. Subsequent to disengagement of probe connector 40 from electrical arc extinguishing pump assembly 56, the electrical potential of second end 22 of conductive inner core 18 is theoretically reduced to ground. Thus, components on safe side 17 of dead front barrier 16 can safely be serviced or otherwise installed or maintained subsequent to disengagement.

In order to re-engage the electrical power to integrated bushing component 10, switch gear arm 36 is urged towards terminal 44 via switch gear arm actuator 42. When switch gear arm 36 is positioned proximate terminal 44, terminal stab 46 again electrically engages switch gear arm 36, thereby re-engaging electrical power to integrated bushing component 10. Switch gear arm 36, subsequent to electrically engaging stab 46, is further urged towards terminal 44 by switch gear arm actuator 42, such that probe connector 40 electrically engages probe receiving end 46 of electrical arc extinguishing pump assembly 56, thus re-establishing the second current path necessary for the aforementioned discontinuity step. Upon engagement of probe connector 40 with pump assembly 56, integrated bushing component is again ready to extinguish an electrical arc upon disengagement of switch gear arm 36.

Figure 5:
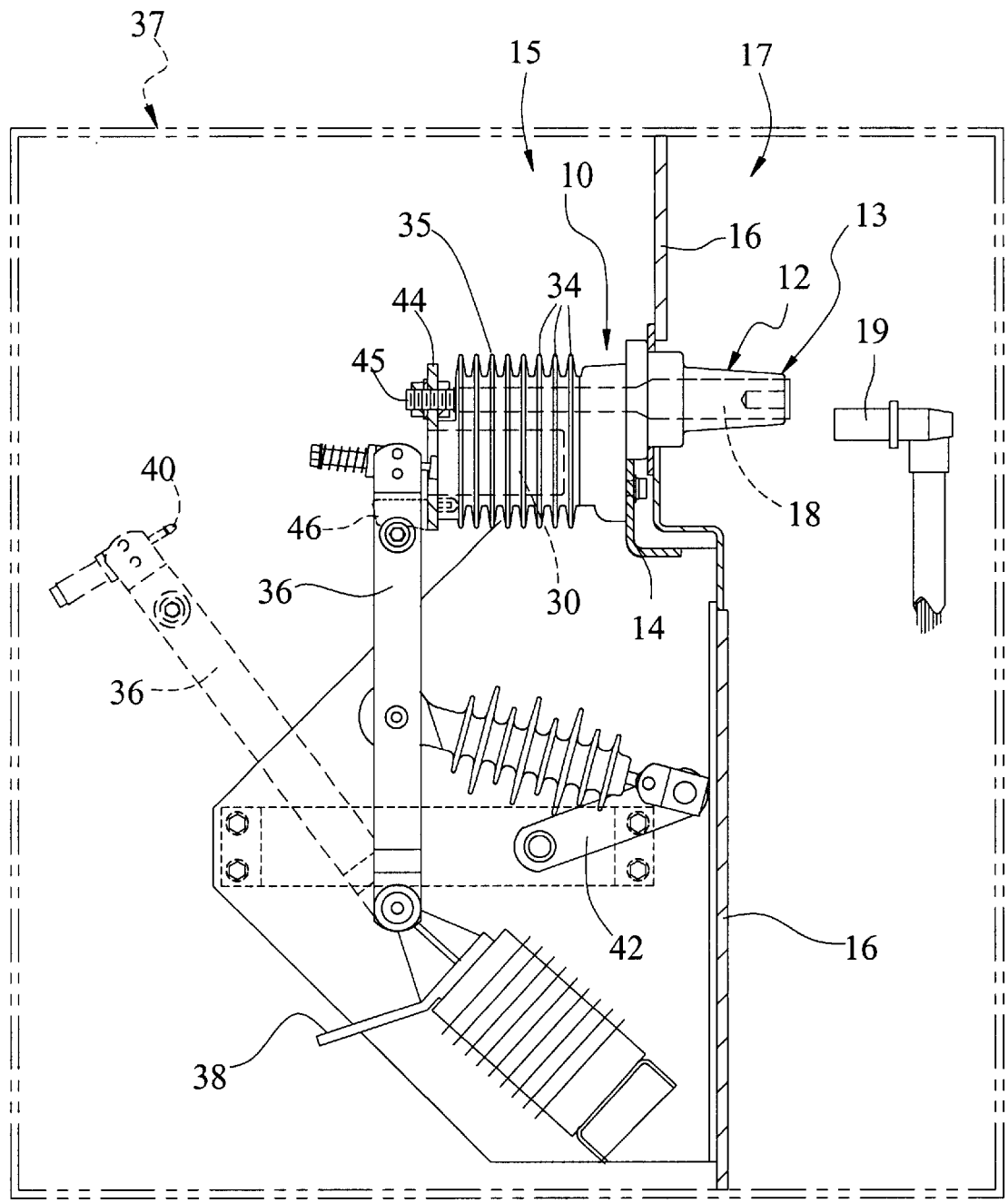
FIG. 5 is a side elevational view of a dual-axis through bushing mounted in a typical switch gear enclosure.

The second embodiment of the present invention is generally shown in FIGS. 5 and 6 at 11. The second embodiment, a dual axis integrated bushing component, utilizes the same principles of manufacture and operation of the single axis embodiment; however, housing 30 for receiving electrical arc extinguishing pump assembly 56 is located on a separate axis from conductive inner core 18. The separation of axes defines an insulative barrier 43 between conductive inner core 18 and pump bore 32, and eliminates the requirement of a conductive sleeve within pump bore 32. This spatial separation necessitates electrical connection between first end 20 of conductive inner core 18 and electrical arc extinguishing pump assembly 56, which is accomplished by terminal 44 and conductive biasing spring 48. Terminal 44 electrically engages first end 20 of conductive inner core 18 via conductive stud 45, which is electrically secured to first end 20 of conductive inner core 18, thereby creating a conductor path from inner core 18 through first end 20, conductive stud 45, and terminal 44, finally electrically engaging stab 46 and conductive spring 48. Electrical engagement of conductive spring 48, in similar fashion to the single axis embodiment, allows for a conductive path through terminal 44, spring 48, pump piston 52, and contactor 53 of electrical arc extinguishing pump assembly 56 to switch gear arm 36 through probe connector 40.

Aside from the lack of a conductive sleeve and the additional electrical connections present on live side 35 of the integrated bushing component 11, the remaining structure and function is nearly identical to that of the single axis embodiment. However, it is to be understood that the form of the invention as shown is a preferred embodiment thereof and that various changes and modifications may be made therein without departing from the spirit of the invention or scope as defined in the following claims.

What is claimed is:

1. A composite electrical switch assembly for use with pad mounted switch gear located within an electrical cabinet, said cabinet having a first inner switch gear confinement area and a second outer electrical component confinement area, said first and second confinement areas separated by a dead front barrier, said composite electrical switch assembly comprising a switch arm, a terminal, and an integrated bushing component, said switch arm selectively positionable from an open non-conducting position and a closed electrically conducting position, said switch arm connecting a first electrical circuit to said terminal in said closed position, said integrated bushing component having in a unitary member, an axially extending electrically conductive inner core and an electrically insulated housing, said inner core conducting a primary electrical current from said terminal located within said first inner switch gear confinement area, through an opening defined in said dead front barrier, to said second outer electrical component confinement area, said integrally formed electrically insulated housing receiving an electrical arc extinguishing pump assembly therein, said arc extinguishing pump conductively biased against said terminal and providing a movable electrical connection between said terminal and a probe connector in conductive attachment to said switch arm.

2. The composite electrical switch assembly as defined in claim 1, wherein said electrically conductive inner core comprises a first end in electrical connection with said terminal and a second end adapted to receive an electrical connection in said second confinement area to a second electrical circuit.

3. The composite electrical switch assembly as defined in claim 1, wherein said electrically conductive inner core is copper.

4. The composite electrical switch assembly as defined in claim 1, wherein said integrated bushing component is made from a cyloaliphatic epoxy resin.

5. The composite electrical switch assembly as defined in claim 1, wherein said integrally formed electrically insulated housing is defined as an elongated bore extending partially inward from a first end of said integrated bushing component, adjacent said terminal.

6. The composite electrical switch assembly as defined in any of claims 1–5, wherein said conductive inner core and said pump bore are formed on separate axes such that they are spaced apart by an insulative barrier defined by said integrated bushing component.

7. The composite electrical switch assembly as defined in any of claims 1–5, wherein said pump bore receives a conductive sleeve therein, said conductive inner core defines at least a portion of said sleeve, and said arc extinguishing pump is received in said sleeve.

8. The composite electrical switch assembly as defined in any of claims 1–5, wherein said pump bore is cooaxial with said conductive inner core, said conductive inner core defines a conductive sleeve received within said pump housing, and said arc extinguishing pump assembly is received in said sleeve.

9. A composite electrical switch assembly, comprising a switch arm, a terminal, and an integrated bushing component, said switch arm selectively positionable between an open non-conducting position and a closed conducting position, said switch arm defining a primary conductive path between a first electrical circuit and said terminal with said switch arm positioned in said closed position, said integrated bushing component comprising in a unitary member, an electrically insulating through bushing, a conductive inner core, a pump housing, and an electrical arc extinguishing pump assembly, said through bushing defining therein said pump housing and an electrically insulated bore, said pump housing defined by a cavity extending partially inward from a first end of said bushing adjacent said terminal, said electrically insulated bore extending between said first end of said bushing and a second end of said bushing distal said terminal, said arc extinguishing pump assembly is received within said pump housing, and said conductive inner core circumscribed by electrically insulated bore, said core defining a conductive path between said terminal and a point proximal said second end of said bushing and communicating said electrical source therethrough, said conductive inner core and said second end of said bushing defining a receiver for coupling conductive engagement with a connector of a second electrical circuit.

10. The composite electrical switch assembly in claim 9, wherein said arc extinguishing pump assembly defines a secondary conductive path between said terminal and a probe connector operably attached to said switch arm, said secondary conductive path selectable with said switch arm between an open non-conducting position and a closed conducting position.

11. The composite electrical switch assembly in claim 10, wherein said secondary conductive path comprises a conductive pump biasing spring, a conductive pump piston, and a contactor, said biasing spring having a first end in conductive contact with said terminal and a second end in conductive contact with said pump piston, said contactor conductively attached to said piston and conductively receiving said probe connector with said switch arm selected in said closed position.

12. The composite electrical switch assembly in claim 10, wherein said secondary conductive path temporarily maintains an electrical connection with said electrical source after severance of said primary conductive path upon movement of said switch arm toward said open non-conducting position.

13. The composite electrical switch assembly in claim 10, wherein said electrically insulated path and said pump housing are defined substantially parallel within said through bushing and are separated by an insulative barrier defined between said insulated path and said pump housing.

14. The composite electrical switch assembly in claim 10, wherein said electrically insulated path and pump housing share a common axis such that said conductive inner core defines at least a portion of said pump housing.

15. The composite electrical switch assembly in claim 14, wherein said conductive inner core defines a conductive sleeve received in said pump housing and said arc extinguishing pump assembly is received within said conductive sleeve.

16. The composite electrical switch assembly of claim 15, wherein said electrically insulated path and pump housing are coaxial, said conductive inner core defining a conductive sleeve at said first end thereof extends coaxially therefrom.

17. The composite electrical switch assembly as in any of claims 9–16 wherein said through bushing is manufactured from a cyloaliphatic epoxy resin.

18. The composite electrical switch assembly as in any of claims 9–16, wherein said conductive inner core is copper.

* * * * *